United States Patent
Hamouz et al.

(10) Patent No.: US 10,083,491 B2
(45) Date of Patent: Sep. 25, 2018

(54) METHOD AND SYSTEM TO PROVIDE FEEDBACK FOR ENERGY SAVING TO A USER OF A PROPERTY COMPRISING A PLURALITY OF APPLIANCES

(75) Inventors: Miroslav Hamouz, Cambridge (GB); Benjamin Kenneth Coppin, Cottenham (GB); Graham Barr, Windsor (GB); Colin Chapman, Cambridge (GB); Jack Elliot Hargreaves, London (GB); Daniel James Palmer, Ipswich (GB)

(73) Assignee: Centrica Hive Limited, Windsor, Berkshire (GB)

( * ) Notice: Subject to any disclaimer, the term of this patent is extended or adjusted under 35 U.S.C. 154(b) by 762 days.

(21) Appl. No.: 14/127,165

(22) PCT Filed: Jun. 14, 2012

(86) PCT No.: PCT/GB2012/051362
§ 371 (c)(1),
(2), (4) Date: May 9, 2014

(87) PCT Pub. No.: WO2012/172352
PCT Pub. Date: Dec. 20, 2012

(65) Prior Publication Data
US 2014/0244057 A1    Aug. 28, 2014

(30) Foreign Application Priority Data
Jun. 17, 2011  (GB) .................................. 1110269.6

(51) Int. Cl.
G06F 19/00    (2018.01)
G06Q 50/06    (2012.01)
H02J 3/00     (2006.01)

(52) U.S. Cl.
CPC .............. *G06Q 50/06* (2013.01); *H02J 3/008* (2013.01); *Y02E 40/76* (2013.01); *Y04S 10/545* (2013.01); *Y04S 10/60* (2013.01); *Y04S 50/10* (2013.01)

(58) Field of Classification Search
CPC ......... G06Q 50/06; H02J 3/008; Y02E 40/76; Y04S 10/545; Y04S 10/60; Y04S 50/10
See application file for complete search history.

(56) References Cited

U.S. PATENT DOCUMENTS 8,560,134 B1 * 10/2013 Lee ..................... H02J 13/0086
                                                          700/28
8,661,283 B2 *  2/2014 Turicchi, Jr. ........... G06F 1/263
                                                         700/286
(Continued)

FOREIGN PATENT DOCUMENTS

EP        2026299 A1    2/2009
JP     2010182146 A     8/2010
(Continued)

OTHER PUBLICATIONS

Shariatinasab, Reza, Bijan Rahmani, and Mohsen Akbari. Application of Wavelet Analysis in Power Systems. INTECH Open Access Publisher, 2012.*

*Primary Examiner* — Michael D Masinick
(74) *Attorney, Agent, or Firm* — Tucker Ellis LLP; Michael G. Craig

(57) ABSTRACT

A system to provide feedback for energy saving to a user of a property comprising a plurality of appliances, the system comprising: at least one sensor monitoring energy consumption of one or more appliances within the property; a user interface to provide feedback to the user; and a processor configured to receive input data from an energy bill for the property covering a predetermined period; receive input regional average statistics regarding energy consumption for
(Continued)

a set of predetermined categories of energy usage; generate a model of energy usage within a plurality of categories over the predetermined period by combining the input data, energy consumption data from the at least one sensor and generic statistics regarding energy consumption and output, via the user interface, feedback to the user based on the generated model.

19 Claims, 8 Drawing Sheets

(56) References Cited

U.S. PATENT DOCUMENTS

| | | | | |
|---|---|---|---|---|
| 8,989,910 B1* | 3/2015 | Klots | | G06Q 50/06 700/291 |
| 2003/0036820 A1* | 2/2003 | Yellepeddy | | G05B 15/02 700/291 |
| 2011/0025519 A1* | 2/2011 | Donaldson | | H04L 67/125 340/664 |
| 2011/0246155 A1* | 10/2011 | Fitch | | G06F 17/5004 703/6 |
| 2011/0276527 A1* | 11/2011 | Pitcher | | G06F 17/5009 706/21 |
| 2011/0288905 A1* | 11/2011 | Mrakas | | G06Q 10/06 705/7.25 |
| 2011/0313964 A1* | 12/2011 | Sanchey Loureda | | G01D 4/002 706/50 |
| 2012/0078431 A1* | 3/2012 | Weatherhead | | G06Q 50/06 700/295 |
| 2012/0259476 A1* | 10/2012 | Trieb | | G06F 1/28 700/295 |
| 2012/0310416 A1* | 12/2012 | Tepper | | G05B 15/00 700/276 |
| 2013/0103656 A1* | 4/2013 | Sanchez Loureda | | G06F 17/30129 707/693 |
| 2013/0204559 A1* | 8/2013 | Hamouz | | G01D 4/002 702/61 |
| 2013/0257626 A1* | 10/2013 | Masli | | G08B 13/19613 340/691.6 |
| 2014/0214221 A1* | 7/2014 | Matthews | | G01D 4/004 700/291 |
| 2015/0046131 A1* | 2/2015 | Fei | | G06F 17/5009 703/2 |

FOREIGN PATENT DOCUMENTS

| | | |
|---|---|---|
| WO | 2009013998 A1 | 1/2009 |
| WO | 2010091450 A1 | 8/2010 |
| WO | 2011052957 A2 | 5/2011 |
| WO | 2011064671 A2 | 6/2011 |
| WO | 2011131984 A2 | 10/2011 |

* cited by examiner

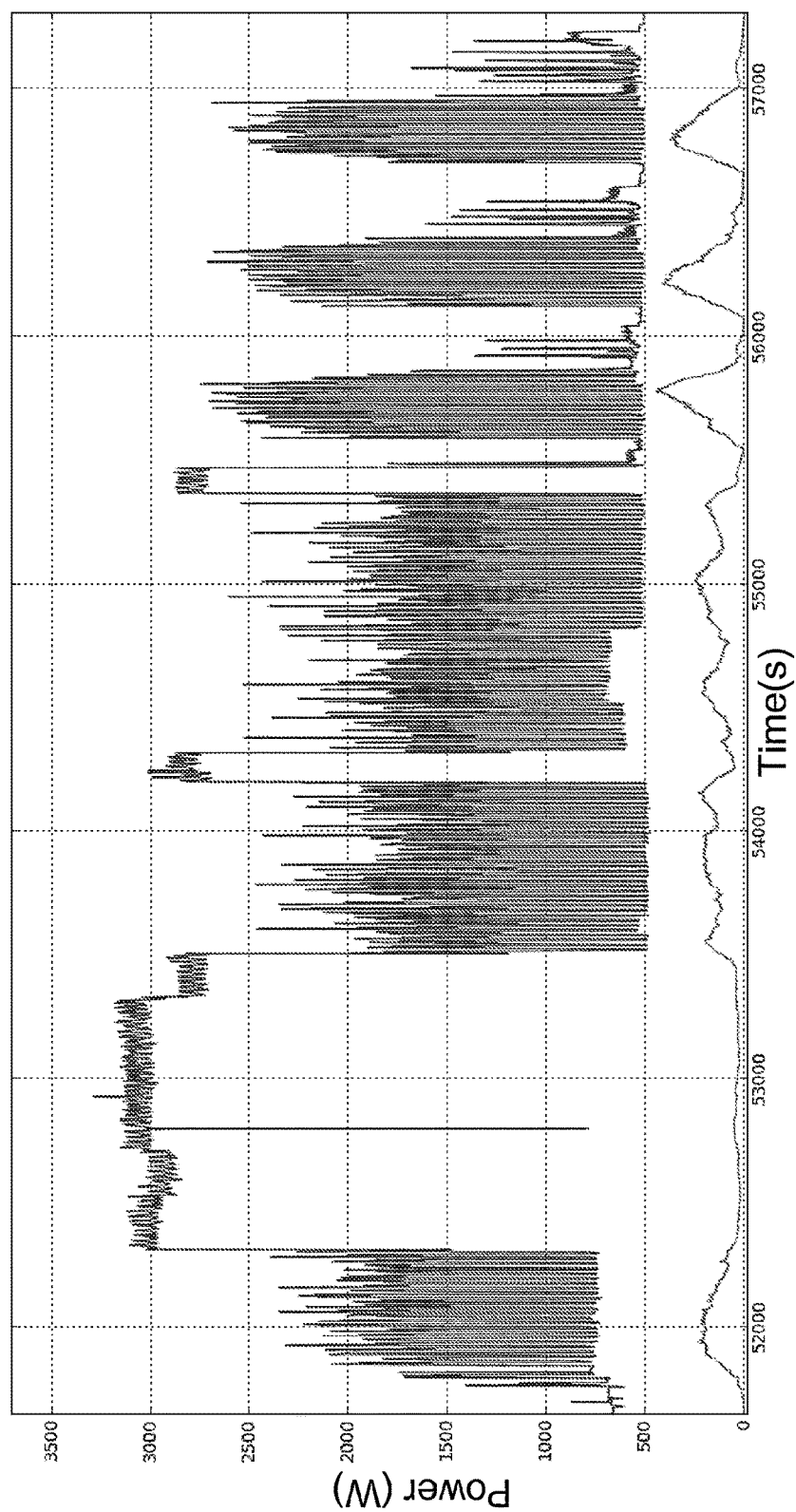

METHOD AND SYSTEM TO PROVIDE FEEDBACK FOR ENERGY SAVING TO A USER OF A PROPERTY COMPRISING A PLURALITY OF APPLIANCES

FIELD OF THE INVENTION

The present invention relates to a systems, methods and computer program code for modelling and providing feedback on the usage of domestic appliances.

BACKGROUND OF THE INVENTION

It is advantageous to present consumers with information explaining where their domestic energy consumption is happening. This is because armed with this information they can then choose to change their behaviour in order to reduce their consumption and thus save themselves money, for example by using costly-to-run appliances less often, or using them in a lower-cost manner when they are used.

SUMMARY OF THE INVENTION

According to the present invention, there is provided a system to provide feedback for energy saving to a user of a property comprising a plurality of appliances, the system comprising
  at least one sensor monitoring energy consumption of one or more appliances within said property;
  a user interface to provide feedback to said user and
  a processor configured to
  receive input data from an energy bill for said property covering a predetermined period;
  receive input regional average statistics regarding energy consumption for a set of predetermined categories of energy usage;
  generate a model of energy usage within a plurality of categories over said predetermined period by combining said input data, energy consumption data from said at least one sensor and generic statistics regarding energy consumption and
  output, via said user interface, feedback to said user based on said generated model.

The data input from the energy bill may be one or more of total cost, kWh used and/or period of bill. The predetermined period may be a month, quarter or other period and may be all or part of the time period covered by the bill. It is important that the bill covers the actual energy used in the period rather than an estimated or seasonally adjusted usage. By generating a model divided into a plurality of categories, energy consumers can see a cost breakdown of their energy bills in to the usage types and/or appliances which constitute their energy usage. Said predetermined categories may be the broad usage categories, for example one or more of space heating, water heating, cooking, lighting and appliances. By providing this breakdown, the user is provided with feedback regarding their actual energy usage and can thus adjust their behaviour to provide energy savings.

The fidelity and accuracy of the breakdown improves as more data is input to the processor to generate the model.

Said regional average statistics may cover any area, region or a country. Thus, they may be national/regional/area average statistics. Said regional average statistics may be input from a database to which the processor is connected. The database may be regularly updated. Regional average statistics which cover an annual (or larger timeframe) hide a very large variation in energy consumption. The seasonal effects are due to the weather, number of daylight hours, national holidays and many other factors. For example, looking at one category in more detail, the amount of energy used for lighting varies in direct proportion to the number of daylight hours in the home. Accordingly, the processor is configured to determine regional average statistics which relate to the predetermined period.

Said processor may be configured to generate said model by determining a weighting for each predetermined category based on said regional average statistics and by applying said weighting to said input bill data to provide energy consumption data for each category. Said weighting may take into account the location of the property and/or the time of year of the predetermined time period.

The user interface may be in the form of a visual display screen for displaying information to a user. Alternatively, the user interface may be in the form of a mechanism, e.g. printer for generating a written summary report. The user interface may be configured to allow a user to input the data from the energy bill. Alternatively, the processor may be connected to a remote device which stores said energy bill and the data may be transmitted over a communications link between the remote device and the system.

Gas and electricity are the primary metered domestic energy sources. The system can adapt to work with any metered energy source. For example, the energy bill may cover electricity consumption only. Where only an electricity bill is provided, categories such as gas space heating, gas water heating and/or gas cooking, will not be modelled. Thus, the predetermined categories may be selected from the group comprising lighting, cooking and appliances. Alternatively, the energy bill may cover gas consumption only. Where only a gas bill is provided, categories such as lighting and appliances will not be modelled. Thus, the predetermined categories may be selected from the group comprising space heating, water heating and cooking.

Alternatively, the energy bill may include an electricity bill and a gas bill. In this case, the predetermined categories may comprise any of the following: space heating, water heating, cooking, lighting and appliances.

The model is a breakdown which attributes cost from said energy bill to different usage categories. The model may be generated by applying one or more of the following assumptions or rules regarding types of energy used by each predetermined category:
  Appliances and lighting are assumed to be electrical.
  Water and space heating are assumed to be gas.
  Cooking is assumed to be electric.
  There are no other electricity sources (e.g. solar).
  There are no secondary methods of heating or cooking.

Alternatively, the processor may be configured to receive input energy type data indicating which type of energy is used by each predetermined category. The processor is preferably configured to override any assumption being used by the model if they conflict with the input energy type data. In other words, where data is not provided, regional averages are assumed.

Said input energy type data may be input by said user via said user interface. Accordingly, the user may indicate to the system what the primary energy source is for each category. For example, for space heating, water heating and cooking, for the UK user this may be one of gas, electric, oil or solid fuel. Where a user has multiple means of space and water heating the system may be configured to allow a separation between primary and secondary heating and the heating effort is attributed evenly between them. In other words, the processor may be configured to receive input energy type data indicating that a primary and a secondary energy type is used by a particular predetermined category and to generate a model of energy usage for said particular predetermined category which distributes energy usage between said primary and a secondary energy type. If the user indicates that space heating, water heating or cooking is provided by an unmetered source such as oil or solid-fuel, these categories of energy consumption will not appear on the breakdown model.

The system produces a more detailed breakdown where there is more information about the particular appliances used in a particular property. Accordingly, the system may be configured to accept information about particular appliances that the consumer uses. The processor may be configured to receive input appliance data. Said input appliance data may include information on numbers and types of appliances within the property. For example, the data may include some or all of number of fridges, number of freezers, number of washing machines, number of dishwashers, number of TVs and number of computers and games consoles. Alternatively, said data may include information on how often said appliances are used, e.g. "how many hours of TV are watched per week". Where data is not provided, regional averages are assumed.

Said input data may be provided by a user via the interface. Alternatively, said input appliance data may be provided by said at least one sensor.

Said processor may be configured to generate a model generating an appliance energy usage model for each of the appliances identified in the input appliance data. These energy usage models may be presented individually to a user or combined under the relevant predetermined category.

Said at least one sensor may monitor energy consumption of one or more of the identified appliances. Where this usage data is being gathered directly by such a real-time energy monitoring system, this data may be used to generate the appliance energy usage model and thus improve the accuracy of the bill breakdown. An appliance's energy usage may be being monitored directly (by directly monitoring the appliance's circuit or gas usage). In this case, its precise energy consumption in the bill period may be known. The system uses this information instead of user's inputs and to improve the accuracy of the bill breakdown. Potentially, no user's inputs are required and the system provides bill breakdown based purely on automatic measurements and processing of the household energy consumption data. As a side-effect, the system provides a comparison of the user's actual usage against their modelled usage.

Alternatively, said least one sensor may be in the form of a high frequency non-intrusive electricity monitor which monitors the overall household electricity or gas supply. In this case, the power consumption of a power consuming device (appliance) may be derived from disaggregating the energy signal. The system uses this information to improve the accuracy of the bill breakdown.

Alternatively, said least one sensor may be in the form of a network sensor which monitors wireless network traffic within the home and identifies appliances by their MAC address and other information. The network sensor and/or processor may use this address and other information to determine on/off times and thus consumption of network-connected appliances The method of calculating the power consumption of a power consuming device may comprise identifying the operation of a power consuming device from an aggregate power series which comprises aggregate power consumption data for a plurality of power consuming devices.

The method of identifying the operation of a power consuming device from an aggregate power series may comprise:
  receiving an aggregate power series, the aggregate power series comprising aggregate power consumption data for a plurality of power consuming devices;
  filtering the aggregate power consumption data to separate the aggregate power consumption data into a fast component and a slow component;
  measuring an average power of the fast component;
  determining periods during which the measured average power is greater than a first threshold; and
  comparing the determined period with a model defining operational characteristics of a power consuming device to identify the operation of a power consuming device.

Filtering may comprise using a wavelet filter, e.g. a Haar wavelet filter. Measuring an average power may comprise measuring a right-tail-10% trimmed root-mean-square of the fast component.

The operational characteristics of the model may comprise one or more of cycle duration, frequency of drum activity and power consumption. In other words, the model is for a power consuming device such as a washing machine.

Where usage data is only available for some of the appliances, the processor may be configured to generate said energy usage models by estimating the electricity consumed by these devices in the bill period based on a model of the appliance's energy consumption.

Each estimated appliance energy usage model may be based on a number of factors, for example
  An estimate of the per-use energy usage of the appliance. For example, a washing machine uses about 1 kWh per cycle.
  An estimate of the number of times the appliance is used in the bill period. This may be based on the number of people in the house and the outdoor temperature (if known).

The consumer may provide no or partial information about the appliances used in the home. The system may be configured to validate the input appliance data and may be configured to generate an error message where the appliances specified would consume more energy than the total billed amount billed.

The system may be configured to attribute energy usage and cost to general categories such as 'Appliances' and 'Lighting' where the usage exceeds the amount that can be attributed directly to particular appliance.

The system may produce a better estimate of heating and appliance usage where the some information about the household is known. Accordingly, said processor is configured to receive input property data detailing information about the property. Such information may include some or all of number of rooms, number of people, house type (Detached, Terrace, Flat, Semi-Detached) and/or level of insulation.

Said input property data may be used to model the likely attribution of energy to different activities. For example:
  Where a washing machine is present, the washing machine will be used more in a 5 person house than in a 2 person house.
  A large house will require more energy to heat than a small house.

The user may provide any or all of this input property data to the system. Where data is not provided, regional averages are assumed.

According to another aspect of the invention, there is provided a method to provide feedback for energy saving to a user of a property comprising a plurality of appliances, the method comprising monitoring energy consumption of one or more appliances within said property;
receiving input bill data from an energy bill for said property for a time period;
receiving input regional average statistics regarding energy consumption for a set of predetermined categories of energy usage;
generating a model of energy usage for said set of predetermined categories over a predetermined time period by combining said input data, energy consumption data from said at least one sensor and said regional average statistics and
outputting feedback to said user based on said generated model.

According to another aspect of the invention, there is provided a system to provide feedback for energy saving to a user of a property comprising a plurality of appliances, the system comprising a processor configured to
receive input data from an energy bill for said property covering a predetermined period;
generate a model of energy usage within a plurality of categories over said predetermined period by combining said input data, energy consumption data from said at least one sensor and generic statistics regarding energy consumption and
output feedback to said user based on said generated model.

According to another aspect of the invention, there is provided a method to provide feedback for energy saving to a user of a property comprising a plurality of appliances, the method comprising receiving input bill data from an energy bill for said property for a time period;
receiving input regional average statistics regarding energy consumption for a set of predetermined categories of energy usage;
generating a model of energy usage for said set of predetermined categories over a predetermined time period by combining said input data, energy consumption data from said at least one sensor and said regional average statistics and
outputting feedback to said user based on said generated model.

For the above aspects, at least one sensor may monitor energy consumption of one or more appliances within said property, e.g. as described in more detail above.

Similarly, the other optional features identified above apply equally to all aspects of the invention.

The invention further provides processor control code to implement the above-described systems and methods, for example on a general purpose computer system or on a digital signal processor (DSP). The code is provided on a data carrier such as a disk, CD- or DVD-ROM, or programmed memory such as read-only memory (Firmware). Code (and/or data) to implement embodiments of the invention may comprise source, object or executable code in a conventional programming language (interpreted or compiled) such as C, or assembly code. The above described systems and methods may also be implemented, for example, on an FPGA (field programmable gate array) or in an ASIC (application specific integrated circuit). Thus the code may also comprise code for setting up or controlling an ASIC or FPGA, or code for a hardware description language such as Verilog (Trade Mark), Java, VHDL (Very high speed integrated circuit Hardware Description Language), or RTL code or SystemC.

As the skilled person will appreciate such code and/or data may be distributed between a plurality of coupled components in communication with one another.

BRIEF DESCRIPTION OF THE DRAWINGS

The present invention will now be described, by way of example only, and with reference to the accompanying figures, in which:

FIG. 1b is a flowchart of the steps in the method to be implemented on the system of FIG. 1a;

FIG. 5a shows an aggregated power series;

FIG. 5b shows a method and system of determining information from FIG. 5a;

DETAILED DESCRIPTION OF PREFERRED EMBODIMENTS

Figure 1A:
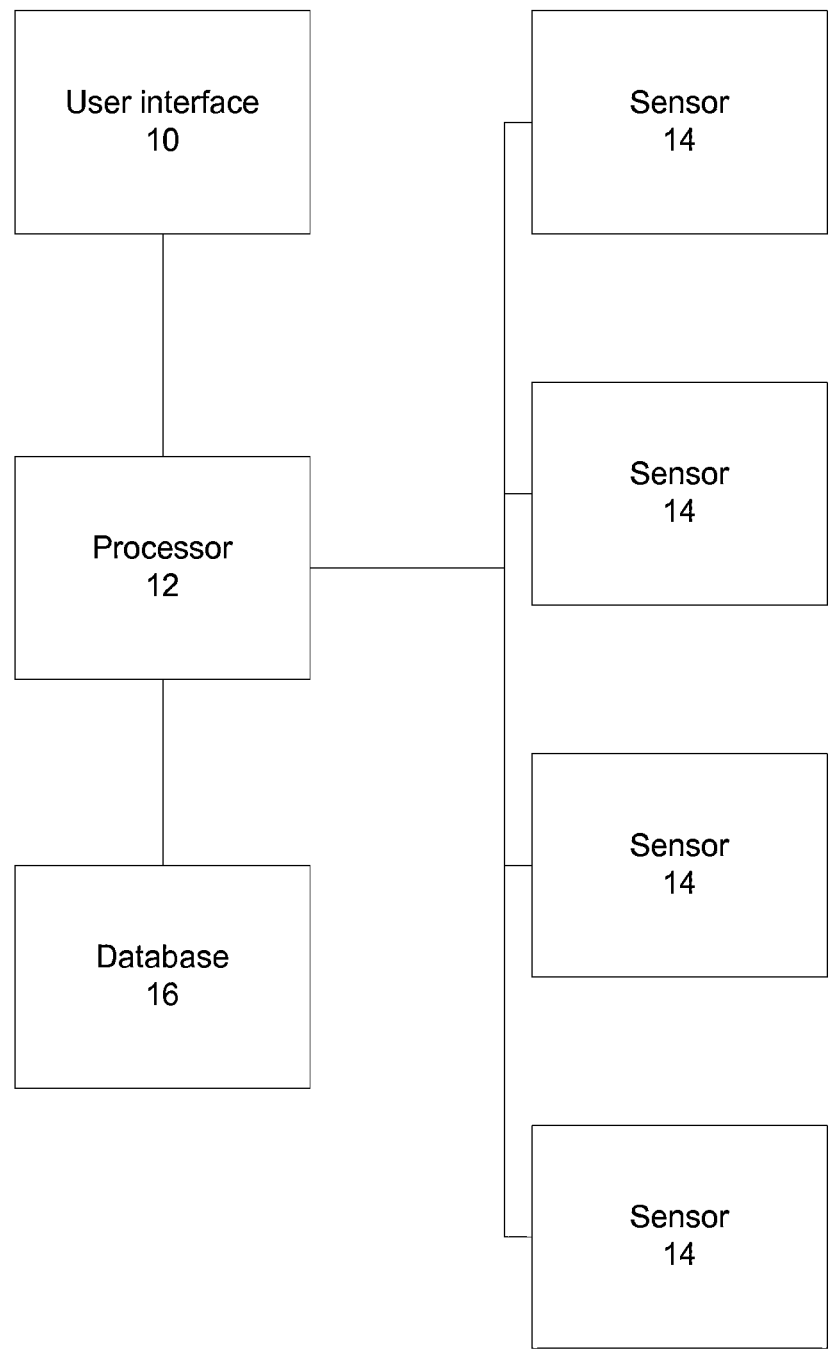
FIG. 1a is a schematic illustration of a system according to one aspect of the invention.
Figure 1B:
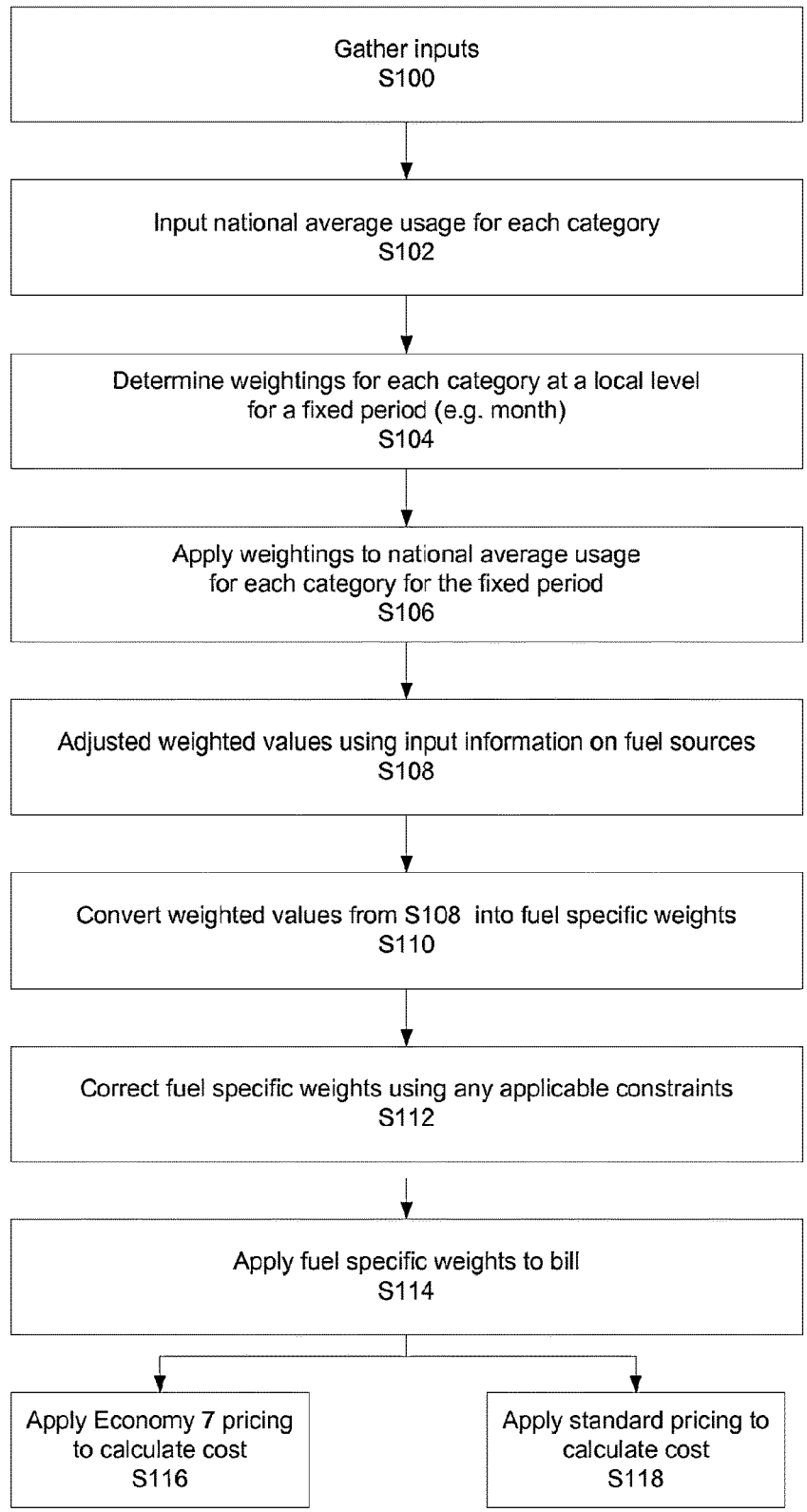

FIGS. 1a and 1b show the system and the steps in the method used by the present invention. The first step S100 is to gather the input data which may include any or all of the following inputs. These inputs may be input by a user on the user interface 10 or may be input from a database 16:

| | |
|---|---|
| Postcode | CB24 |
| Month | April 2011 |
| Heating type | Gas |
| Hot water type | Gas |
| Oven type | Gas and electricity |
| Gas kWh | 1000 |
| Gas cost | £40 |
| Electricity kWh | 1000 |
| Electricity cost | £135 |

Before the inputs are entered into the system, they are preferably checked to ensure that there is no obvious data error.

The next step S102 is to look up national average usage for various categories including heating, cooking, hot water, lighting and appliances in kWh for the year. These values may be stored in database 16. For simplification, the same database is shown as providing the data for both steps S100 and S102. However, it will be appreciated that the data may be divided across databases. Furthermore, the database(s) may be regularly updated and may be in the form of a server managed by the data provider.

For example, annual national average usages (in kWh):

|  | Gas | Electricity |
|---|---|---|
| Heating | 10000 | 5000 |
| Cooking | 1000 | 500 |
| Hot water | 5000 | 4000 |
| Lighting | 0 | 500 |
| Appliances | 0 | 1000 |

In the UK annual domestic energy consumption is thus dominated by heating (affected by space) and water. This annual view hides a very large variation in energy consumption throughout the year. The seasonal effects are due to the outside temperature and number of daylight hours. Thus, in summer typically little or no heating is used and the usage of lighting is reduced. By contrast, the proportion used on water increases dramatically in summer relative to winter.

Figure 2:
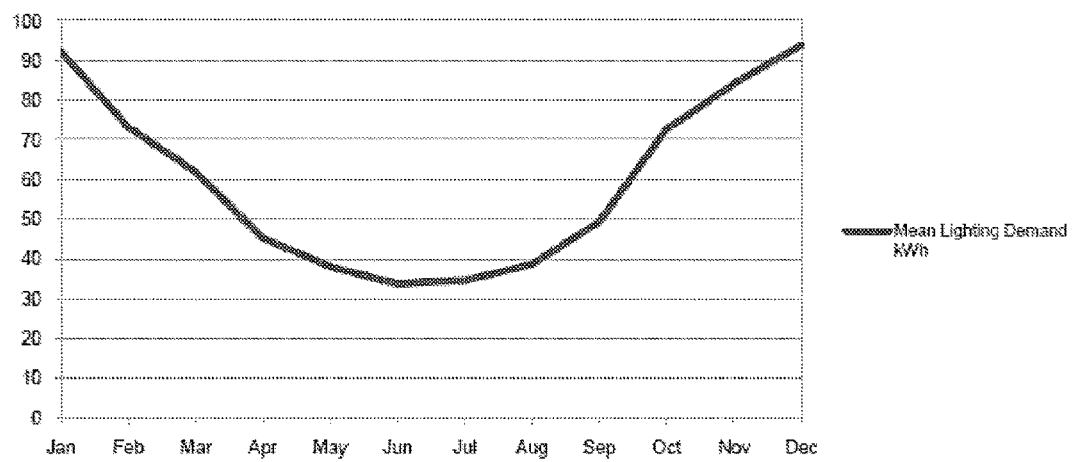
FIG. 2 shows the variation in mean lighting demand over a typical year.

Looking at one category in more detail, the amount of energy used for lighting varies in direct proportion to the number of daylight hours in the home. FIG. 2 shows the variation month-by-month of the mean lighting demand. This graph is known as the Lighting model and may be used to determine the proportion of electricity used for lighting in the bill period.

Figure 3:
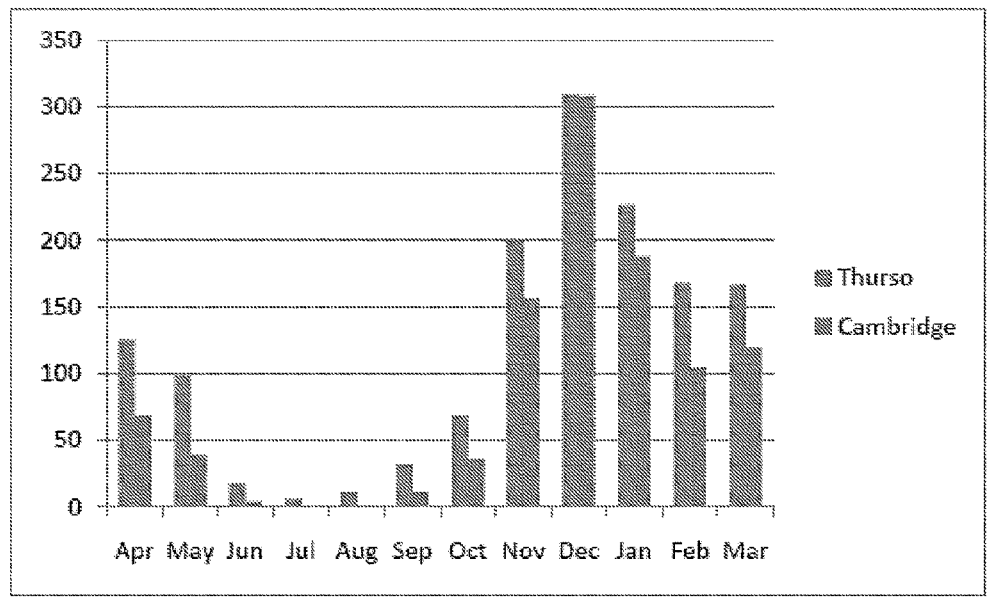
FIG. 3 shows the variation in day light hours between Thurso and Cambridge.

The lighting model also shows that lighting demand varies regionally as well as seasonally as shown in FIG. 3. For example, Thurso gets more sunlight in the summer than Cambridge and less in the winter. In cases, where the user tells the system his location, the system calculates the Stokes model for that location. Where the location of the user cannot be determined a central UK location may be assumed.

The regional variations affect all categories. Accordingly, returning to FIG. 1b the next step S106 is for the processor to determine consumption distribution for each category by month, based on a defined threshold temperature, the location (postcode) and the month. The output is a set of heating degree day ratios for each month in the year. This set of figures may be termed a monthly weighting with the sum of the weightings across the whole year adding to 1. For example, the amount of cooking is reasonably consistent across each month and thus each month has the same weighting (1/12=0.08). By contrast, the weighting for heating varies from a maximum of 0.22 in January to a minimum of 0 for the summer months.

|  | Heating | Cooking | Hot water | Lighting | Appliances |
|---|---|---|---|---|---|
| January | 0.22 | 0.08 | 0.20 | 0.14 | 0.08 |
| February | 0.18 | 0.08 | 0.19 | 0.13 | 0.08 |
| March | 0.13 | 0.08 | 0.14 | 0.12 | 0.08 |
| April | 0.09 | 0.08 | 0.08 | 0.08 | 0.08 |
| May | 0.04 | 0.08 | 0.03 | 0.05 | 0.08 |
| June | 0.01 | 0.08 | 0.02 | 0.05 | 0.08 |
| July | 0.00 | 0.08 | 0.00 | 0.05 | 0.08 |
| August | 0.00 | 0.08 | 0.00 | 0.03 | 0.08 |
| September | 0.01 | 0.08 | 0.02 | 0.03 | 0.08 |
| October | 0.05 | 0.08 | 0.04 | 0.04 | 0.08 |
| November | 0.12 | 0.08 | 0.13 | 0.14 | 0.08 |
| December | 0.17 | 0.08 | 0.16 | 0.14 | 0.08 |

Merely as an example, April is used as the fixed period, so the highlighted values are the ones that will be used.

The next step S106 is for the processor to apply the weightings to obtain national average usage for the month for each category in the specified location, in kWh.

|  | Gas | Electricity |
|---|---|---|
| Heating | 10000 * 0.09 = 900 | 5000 * 0.09 = 450 |
| Cooking | 1000 * 0.08 = 80 | 500 * 0.08 = 40 |
| Hot water | 5000 * 0.08 = 400 | 4000 * 0.08 = 320 |
| Lighting | 0 | 500 * 0.08 = 40 |
| Appliances | 0 | 1000 * 0.08 = 80 |

In other words, the national average usage from the second step is multiplied by the appropriate weighting.

The original input information on fuel sources for heating, hot water and cooking gathered in the first step is next applied, by the processor, to provide user specific weighted values (step S108). In this case, the input information was that gas heating, gas hot water and a duel fuel cooker are used. Accordingly, the weighted national average electricity heating and water values are discarded and the cooking figures are halved to give a suitable total figure.

|  | Gas | Electricity |
|---|---|---|
| Heating | 900 | 0 (discarded) |
| Cooking | 40 | 40 |
| Hot water | 400 | 0 (discarded) |
| Lighting | 0 | 40 |
| Appliances | 0 | 80 |

The user specific weighted values are used to determine a second set of weights (Step S110) in which weighting takes account of the total amount of each fuel being used. The totals are Gas=900+80+400=1380 and Electricity=40+40+80=160. Accordingly, the second set of weights are determined by dividing the user specific weighted values by the total for the relevant fuel.

|  | Gas | Electricity |
|---|---|---|
| Heating | 900/1380 = 0.65 | 0 |
| Cooking | 80/1380 = 0.06 | 40/160 = 0.25 |
| Hot water | 400/1380 = 0.29 | 0 |
| Lighting | 0 | 40/160 = 0.25 |
| Appliances | 0 | 80/160 = 0.5 |

The fuel weights are then corrected by applying any applicable constraints (step S112). In this case, there are no constraints. However, the constraints may be some or all of:

heating cost in winter cannot be 0.

heating cost in winter must be larger than that of any other category.

Lighting cost may not be larger than total of heating, cooking and hot water

At step S114, the fuel specific weights are applied to the bill to generate the usage in kWh for each category. For example, if the bill values are given as:

| Gas kWh | 1000 |
|---|---|
| Gas cost | £40 |
| Electricity kWh | 1000 |
| Electricity cost | £135 |

Multiplying these values by the fuel specific weights gives:

|  | Gas | Electricity |
|---|---|---|
| Heating | 0.65 * 1000 = 650 kWh | 0 kWh |
| Cooking | 0.06 * 1000 = 60 kWh | 0.25 * 1000 = 250 kWh |
| Hot water | 0.29 * 1000 = 29 kWh | 0 kWh |
| Lighting | 0 | 0.25 * 1000 = 250 kWh |
| Appliances | 0 | 0.5 * 1000 = 500 kWh |

If the user has Economy 7, at step S116 Economy 7 prices are applied to the usage output of the previous step to calculate cost for each category. If the user does not have Economy 7, at step S118 standard prices are applied to the usage output of the previous step to calculate cost for each category.

|  | Gas | Electricity |
|---|---|---|
| Heating | 0.65 * £40 = £26.00 | £0.00 |
| Cooking | 0.06 * £40 = £2.40 | 0.25 * £135 = £33.75 |
| Hot water | 0.29 * £40 = £11.60 | £0.00 |
| Lighting | £0.00 | 0.25 * £135 = £33.75 |
| Appliances | £0.00 | 0.5 * £135 = £67.50 |

Figure 4A:
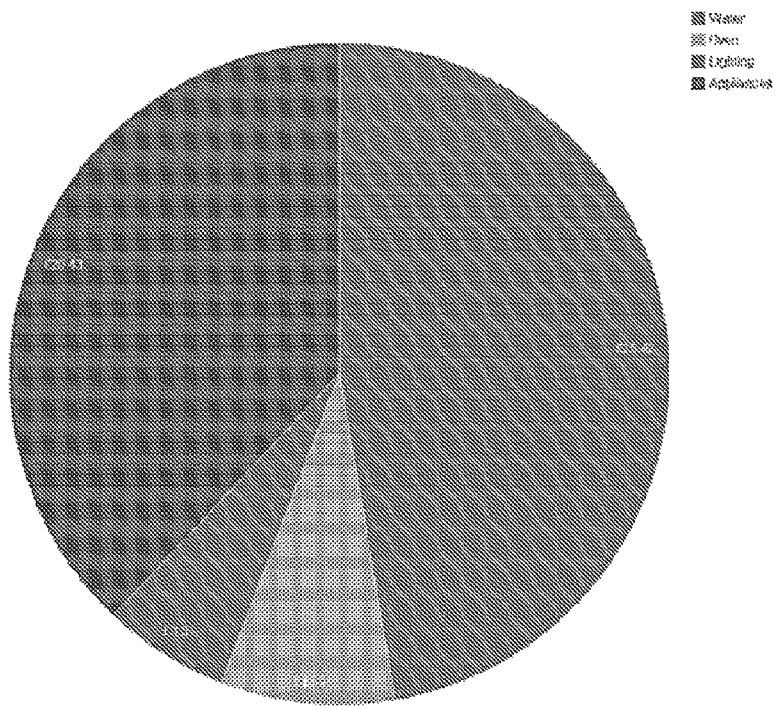
FIGS. 4a and 4b are pie charts illustrating usage in different categories in different seasons.
Figure 4B:
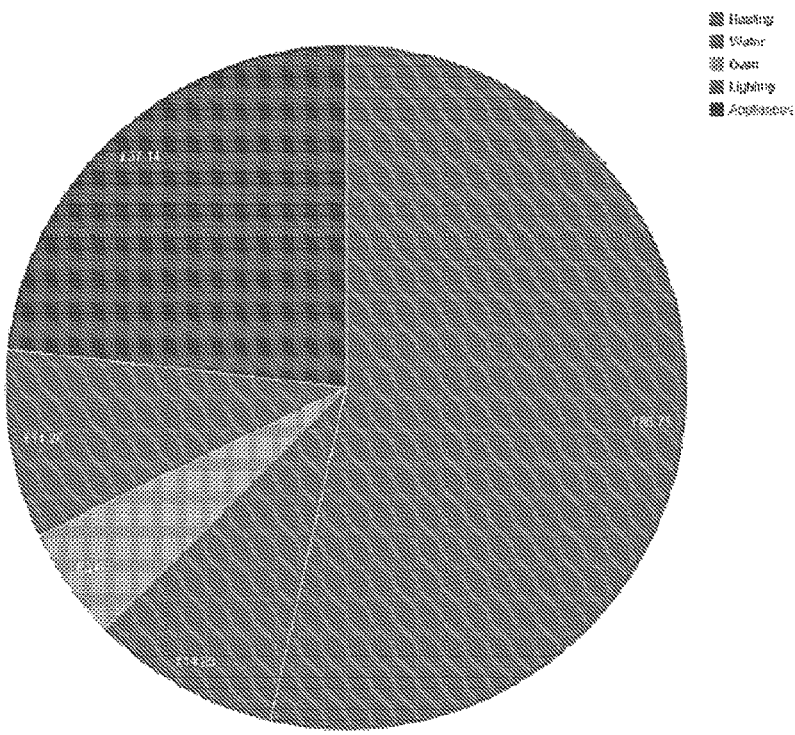

This information may then be displayed to a user in a variety of ways. For example, FIGS. 4a and 4b plots the results as a pie chart which may be displayed on the user interface. FIG. 4a shows the usage in summer and FIG. 4b the usage in winter. The difference in energy usage breakdown between summer and winter is very evident.

The system may be adapted to produce a more detailed breakdown if at step S100 in FIG. 1b the consumer volunteers information about the particular appliances they use. The system accepts input information about particular appliances that the consumer uses including:
  Number of Fridges
  Number of Freezers
  Number of Washing Machine
  Number of Dishwasher
  Number of TVs
  Number of Computers and Games Consoles The breakdown such as that shown in FIGS. 4a and 4b may then include an estimate of the electricity consumed by these devices in the bill period based on a model of the appliance's energy consumption.

A more detailed breakdown may be provided if a user has a real-time energy monitoring system installed. The information from such a system can be used to improve the accuracy of the bill breakdown. For example, where an appliance's energy usage is being monitored directly (by directly monitoring the appliance's circuit or gas usage), its precise energy consumption in the bill period may be known. In this case, a sensor 14 in the form of a Smart Plug is employed to gather data on use of an appliance; a preferred example can be found in our published PCT application WO2009/109787 (incorporated by reference). A plurality of such sensors 14 are connected to the processor to provide information on the various appliances. The system uses this information to improve the accuracy of the bill breakdown. As a side-effect, the system provides a comparison of the user's actual usage against their modelled usage.

Where a sensor 14 providing high frequency non-intrusive electricity monitoring is in place (e.g. monitoring of the household electricity or gas supply) the system benefits from appliance usage information derived from disaggregating the energy signal. The system uses this information to improve the accuracy of the bill breakdown. The disaggregation may be performed as summarised below in relation to FIGS. 5a to 6 and as taught in the applicant's own earlier application PCT/GB2011/050783 filed 20 Apr. 2011 or UK patent application GB1006817.9 filed on 23 Apr. 2010 (both incorporated by reference).

FIG. 5a shows an aggregated power series for a property over a period of approximately 5000 seconds, during which various power consuming devices are switched were in operation (in this example, the power consuming device under investigation is a washing machine). The data is sampled at approximately 1 Hz. Identifying specific times of operation of power consuming devices, such as a washing machine, and determining useful parameters such as power consumption of such a device directly from this raw data would be difficult.

Figure 5B:
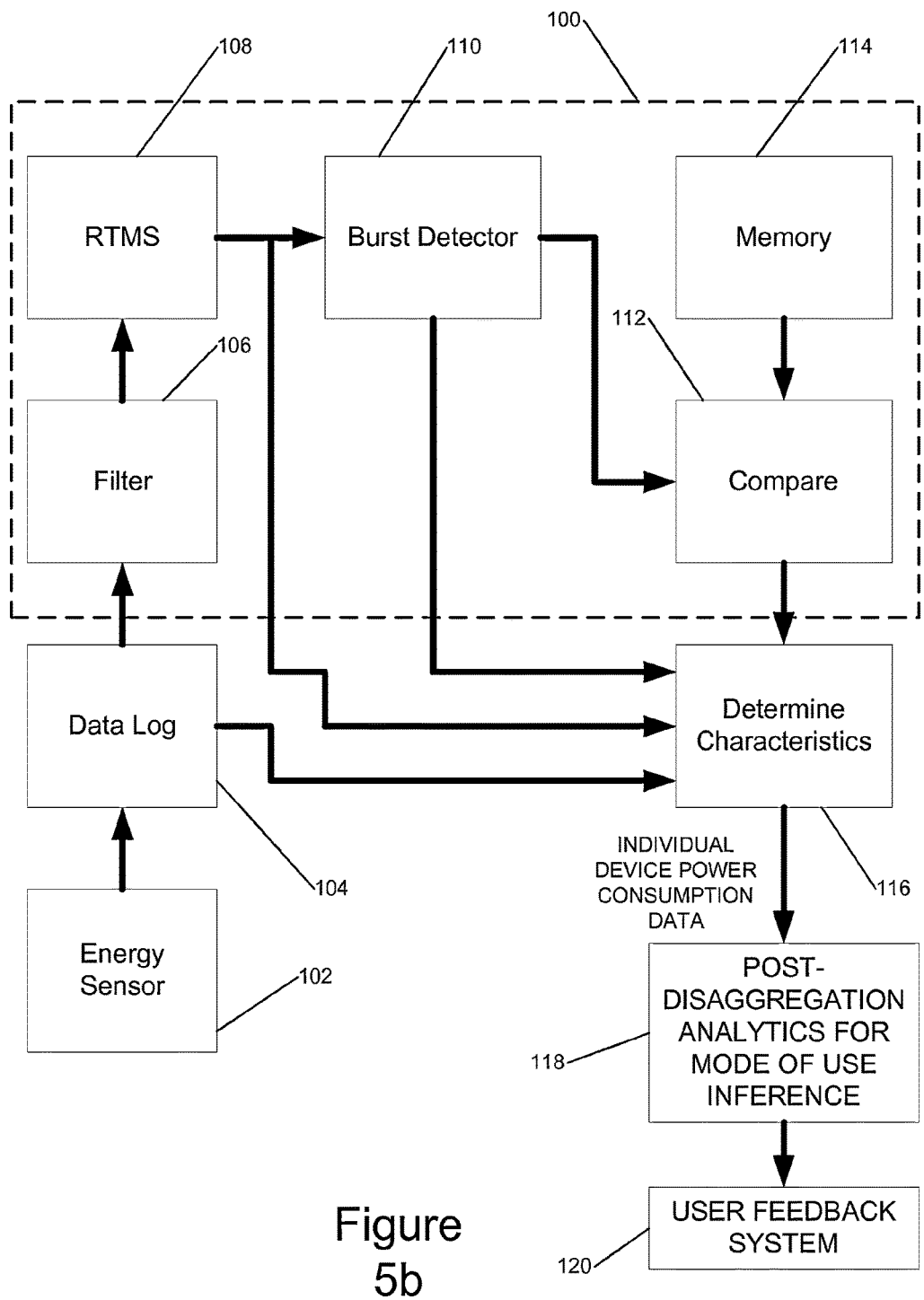

FIG. 5b shows a system for identifying the operation of a power consuming device (for example a washing machine) from an aggregate power series, and for analysing this data to provide user feedback. A data log 104 receives and stores aggregate power series data from an energy sensor 102. The sensor 102 may be a non-invasive sensor, for example a sensor inductively coupled to one of the phase supplies for the property of interest. It is assumed that the energy sensor provides real or apparent power data. (In other embodiments a current sensor may be employed, for example assuming or measuring a mains voltage). The system 100 receives the stored aggregate power series data from the data log 104. The aggregate power series data comprises electrical power consumption data for a number of power consuming devices in the property of interest.

The system 100 filters the aggregate power consumption data to separate the data into 'fast' and 'slow' components. For example, the filter is a wavelet filter (e.g. a Haar wavelet filter). The terms 'fast' and 'slow' components are used to identify power components of the data that change relatively faster or slower compared to the sample rate of the data. For example, the heating element of a washing machine could be on for a period of several minutes during a full washing cycle. This would be considered a slow component. On the other hand, operation of the motor to drive the washing machine drum (on for several seconds, off for several seconds, on for several seconds and so on) would be considered a fast component.

Although in the wavelet domain one cannot directly talk about cut-off frequencies, there is a relationship between the level of decomposition and frequency. The equivalent harmonic cut-off frequency of the preferred wavelet filter used in the present invention is 0.125 Hz, which corresponds to the harmonic period of 8 seconds. As such, and for the avoidance of doubt, a component having an on-off period of less than 8 seconds will be considered a fast component. Anything above 8 seconds will be considered a slow component. The skilled person will understand that other values may be used. A wavelet filter is the preferred filter, as it localizes well in time and frequency. The signal is non-stationary, nor linear, so linear filters are not appropriate for this task. However, other time-frequency methods may be used, for example short Fourier Transforms.

Once separated into fast and slow components by the wavelet filter 106, the fast component data is passed to a module 108 for measuring the average power of the fast component. Preferably, this is carried out using a right-tail-10%-trimmed mean square algorithm (RTMS) i.e. an asymmetric trimmed mean. In such an algorithm, the 10% of highest values (the right tail) are discarded; the smallest values (left tail) are left untouched (compared to other 10% trimmed mean square algorithms, in which the upper and lower 10% of values are discarded). This provides a statistically more accurate measure of the average power without other components (for example a kettle operated during the washing cycle) skewing the results. Devices such as kettles produce spikes in the high-frequency channel, as they generate high frequency, high amplitude content, which would bias an estimate for the washing machine if the values were just averaged. The right-tail-10%-trimmed-mean-square algorithm provides a statistical filtering function.

Figure 5C:
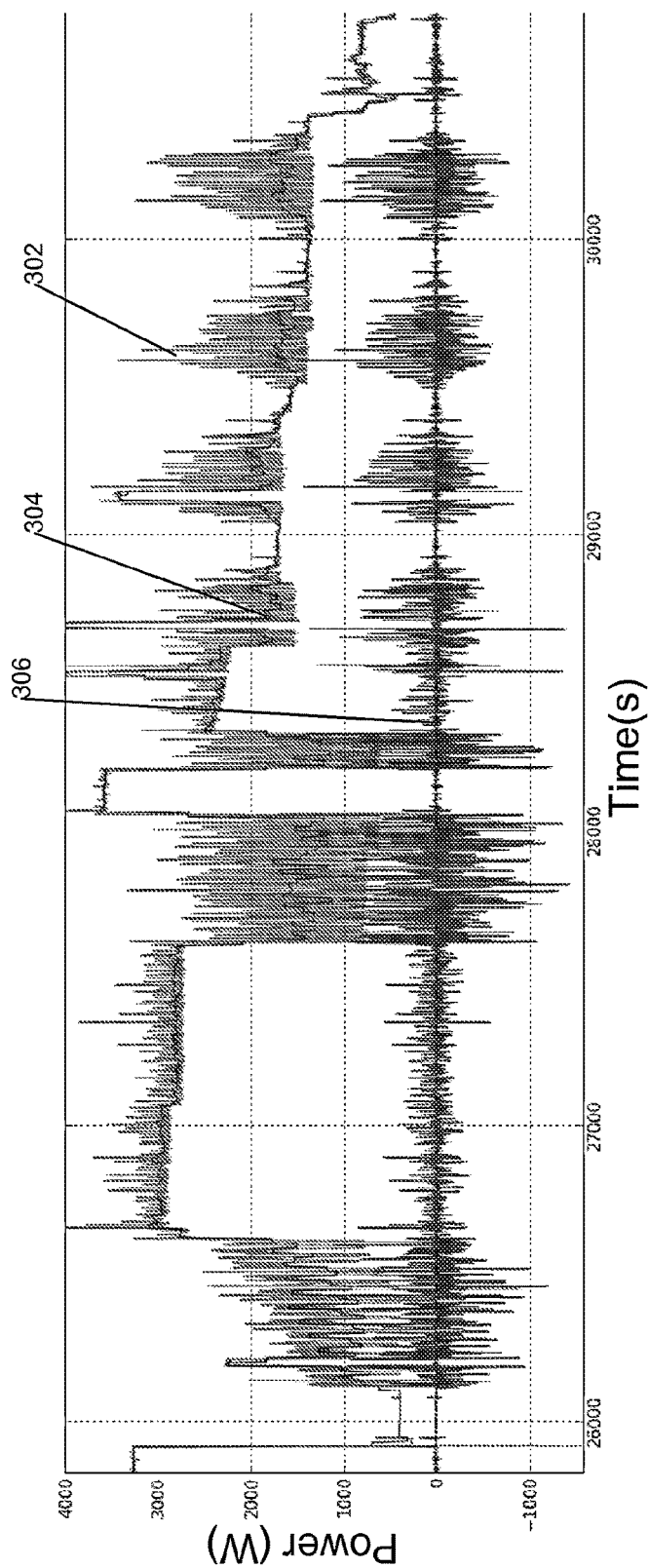
FIG. 5c shows the separated fast and slow components from an aggregated power series.

FIG. 5c shows the separated fast and slow components from an aggregated power series. The line 302 is the aggregate power series. Within that line can be seen the slow component 304. The lowest line 306 shows the fast component. Once converted into an RTMS value, the measured power data is passed to a burst detector 110, which compares the RTMS value against a threshold RTMS power value. The threshold is set at a value that corresponds to known operation of the washing machine. Any RTMS value above the threshold is considered a valid value, and therefore an indication that the washing machine is in operation. For example, the threshold may be set at 25.

Bursts of activity detected by the burst detector correspond to periods when the washing machine's drum is turning. During operation, the drum may turn several times, stop for several seconds, turn several times in the other directions, stop for several seconds and so on. Typically the duration of such "burst" is from 4 minutes (later in the programme as seen in the figure) to an hour (the initial washing cycle is quite long). Again this varies with the programme, make, model etc.

Figure 6:
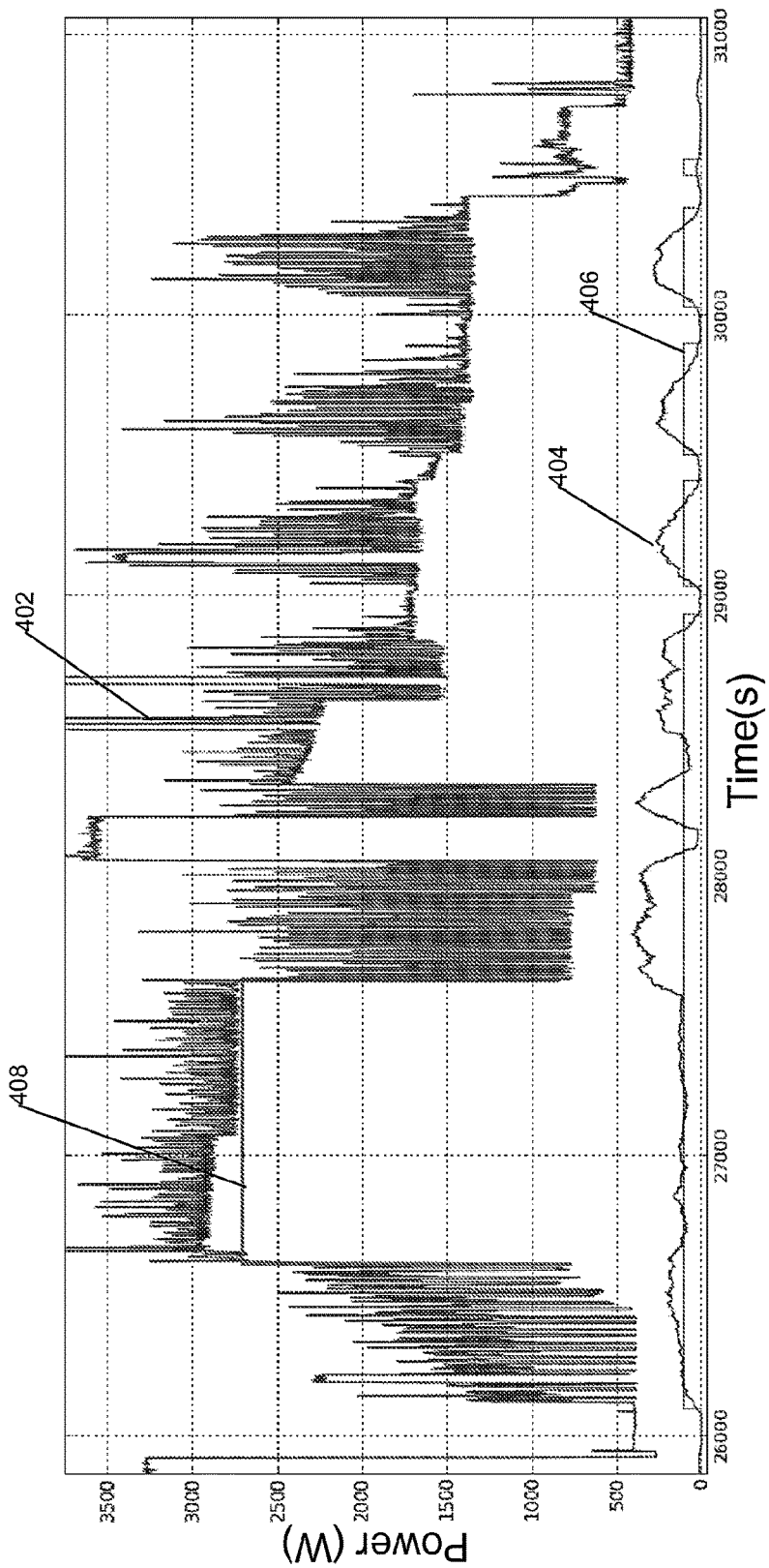
FIG. 6 shows the RTMS value and burst analysis of an aggregated power series.

FIG. 6 shows the RTMS value and burst analysis of an aggregated power series. The upper line is the aggregate power series data 402. Line 404 is the RTMS value taken from the fast component of the aggregate power series. Line 406 is the output of the burst detector. Line 408 denotes a period when the heating element of the washing machine is in operation. The burst detector 110 therefore provides a signal that is dependent on the operation of the washing machine, and therefore provides an indication of when the washing machine is in operation. The washing machine can then be identified by comparing the measured or processed data (i.e. the raw data from the data log, the output of the RTMS module or the output of the burst detector) against a model of various known characteristics of the washing machine (for example stored in a memory 114).

Once the operational window of the washing machine has been detected, all manner of characteristics of the washing machine may be obtained 116. For example, the on and off time may be determined, which gives a measure of the duration of the whole cycle. A total power consumption value may be calculated from the on periods and the RTMS value for those on periods, and the associated cost may be calculated from the above and known energy consumption values.

Furthermore, once the power consumption signature of the washing machine has been identified from the above method, this data can be compared with previously-stored power consumption cycles of the washing machine. Any substantial differences between the latest data and previously-stored data could indicate a change in user habits, and the user can therefore be alerted.

In embodiments the system infers a mode of use of the appliance 118, for example a water volume and/or temperature, from the determined device power consumption characteristics, and then provides user feedback 120. The feedback may take many forms including one or more of: graphical, textual, verbal, visual, feedback to a mobile device such as a mobile phone, feedback via a web interface, and the like.

No doubt many other effective alternatives will occur to the skilled person. It will be understood that the invention is not limited to the described embodiments and encompasses modifications apparent to those skilled in the art lying within the scope of the claims appended hereto.

What is claimed is:

1. A system to provide feedback for energy saving to a user of a property comprising a plurality of appliances, the system comprising:
   at least one sensor monitoring energy consumption of at least one appliance within said property, resulting in energy consumption data for the at least one appliance;
   a user interface to provide feedback for energy saving to said user; and
   a processor configured to:
      receive input bill data from an energy bill for said property for a predetermined time period, wherein the input bill data includes an energy consumption value indicating energy used for the predetermined time period;
      receive input regional average statistics specifying a respective average energy consumption value for each of a set of predetermined categories of energy usage; and
      generate a model of energy usage for said set of predetermined categories over said predetermined time period by combining said input bill data, energy consumption data from said at least one sensor and said regional average statistics,
      wherein said processor is configured to generate said model by:
         multiplying the respective average energy consumption value for each of the predetermined categories by a respective first weighting associated with the predetermined time period to determine a plurality of first energy consumption values, wherein said plurality of first energy consumption values includes a respective first energy consumption value for each predetermined category;
         determining a respective second weighting for each predetermined category based on said plurality of first energy consumption values; and
         multiplying said respective second weighting for each predetermined category by said energy consumption value from the input bill data to provide a respective second energy consumption value for each predetermined category;
   the processor further configured to output, via said user interface, data based on said generated model.

2. A system according to claim 1, wherein said respective first weighting takes into account an element selected from a group consisting of a location of the property and a time of year of the predetermined time period.

3. A system according to claim 1, wherein said energy bill covers electricity usage.

4. A system according to claim 3, wherein each category of said set of predetermined categories is selected from a group consisting of lighting, cooking and appliances.

5. A system according to claim 1, wherein said energy bill covers gas usage.

6. A system according to claim 5, wherein each category of said set of predetermined categories is selected from a group consisting of space heating, water heating and cooking.

7. A system according to claim 1, wherein said processor is configured to receive input energy type data indicating which type of energy is used by each predetermined category, and wherein said processor is further configured to generate said model of energy usage by combining said input energy type data with said input bill data and said regional average statistics.

8. A system according to claim 7, wherein said processor is configured to receive input energy type data indicating that a primary and a secondary energy type is used by a particular predetermined category, and wherein said processor is further configured to generate a model of energy usage for said particular predetermined category which distributes energy usage between said primary and a secondary energy type.

9. A system according to claim 1, wherein said processor is configured to receive input appliance data detailing the number and types of appliances within the property.

10. A system according to claim 9, wherein said processor is configured to generate said model by generating at least one appliance energy usage model, wherein said at least one appliance energy usage model includes a respective appliance energy usage model for each appliance identified in the input appliance data, and wherein said processor is configured to generate each of said appliance energy usage models by estimating energy consumed by each respective appliance identified in the input appliance data.

11. A system according to claim 10 wherein said processor is configured to modify said at least one appliance energy usage model using data from said at least one sensor.

12. A system according to claim 1, wherein said processor is configured to receive input property data detailing information about the property, and wherein said processor is further configured to generate said model of energy usage by combining said input property data with said input bill data and said regional average statistics, 13. A system according to claim 1,
wherein said at least one sensor is configured to generate an aggregate power series, wherein the aggregate power series includes aggregate power consumption data for a plurality of power consuming devices, and
wherein said processor is configured to:
filter the aggregate power consumption data to separate the aggregate power consumption data into a fast component and a slow component;
determine an average power of the fast component;
determine at least one period where the average power is greater than a threshold; and
compare the at least one period with a model defining operational characteristics of a power consuming device to identify the operation of at least one power consuming device of said plurality of power consuming devices.

14. A system according to claim 13, wherein said processor is configured to filter said aggregate power consumption data using a Haar wavelet filter.

15. A system according to claim 13, wherein said processor is configured to determine said average power by measuring a right-tail-10% trimmed root-mean-square of the fast component.

16. A system according to claim 13, wherein each operational characteristic of the operational characteristics is selected from a group consisting of cycle duration, frequency of drum activity and power consumption.

17. A system according to claim 13, wherein the processor is configured to calculate the power consumption of a power consuming device by:
identifying the operation of the power consuming device; and
calculating the power consumption using the average power for the at least one period.

18. A computer-implemented method for providing feedback for energy saving to a user of a property comprising a plurality of appliances, the method comprising:
monitoring energy consumption of at least one appliance within said property using at least one sensor, resulting in energy consumption data for the at least one appliance;
receiving input bill data from an energy bill for said property for a predetermined time period, wherein the input bill data includes an energy consumption value indicating energy used for the predetermined time period;
receiving input regional average statistics specifying a respective average energy consumption value for each of a set of predetermined categories of energy usage;
generating a model of energy usage for said set of predetermined categories over said predetermined time period by combining said input bill data, energy consumption data from said at least one sensor and said regional average statistics, and wherein said generating further comprises:
multiplying the respective average energy consumption value for each of the predetermined categories by a respective first weighting associated with the predetermined time period to determine a plurality of first energy consumption values, wherein said plurality of first energy consumption values includes a respective first energy consumption value for each predetermined category;
determining a respective second weighting for each predetermined category based on said plurality of first energy consumption values; and
multiplying said respective second weighting for each predetermined category by said energy consumption value from the input bill data to provide a respective second energy consumption value for each predetermined category;
the method further comprising outputting data indicative of feedback for energy saving based on said generated model via a user interface.

19. A non-transitory computer-readable medium having instructions stored thereon that, if executed by a computer system, cause said computer system to perform operations for providing feedback for energy saving to a user of a property comprising a plurality of appliances, the operations comprising:
monitoring energy consumption of at least one appliance within said property using at least one sensor, resulting in energy consumption data for the at least one appliance;
receiving input bill data from an energy bill for said property for a predetermined time period, wherein the input bill data includes an energy consumption value indicating energy used for the predetermined time period;
receiving input regional average statistics specifying a respective average energy consumption value for each of a set of predetermined categories of energy usage;

generating a model of energy usage for said set of predetermined categories over said predetermined time period by combining said input bill data, energy consumption data from said at least one sensor and said regional average statistics, and wherein said generating further comprises:

multiplying the respective average energy consumption value for each of the predetermined categories by a respective first weighting associated with the predetermined time period to determine a plurality of first energy consumption values, wherein said plurality of first energy consumption values includes a respective first energy consumption value for each predetermined category;

determining a respective second weighting for each predetermined category based on said plurality of first energy consumption values; and multiplying said respective second weighting for each predetermined category by said energy consumption value from the input bill data to provide a respective second energy consumption value for each predetermined category;

the operations further comprising outputting data indicative of feedback for energy saving based on said generated model via a user interface.

* * * * *